G. N. PALMER.
Stone Gatherer.
No. 77,833.　　　　　　　　　　　Patented May 12, 1868.
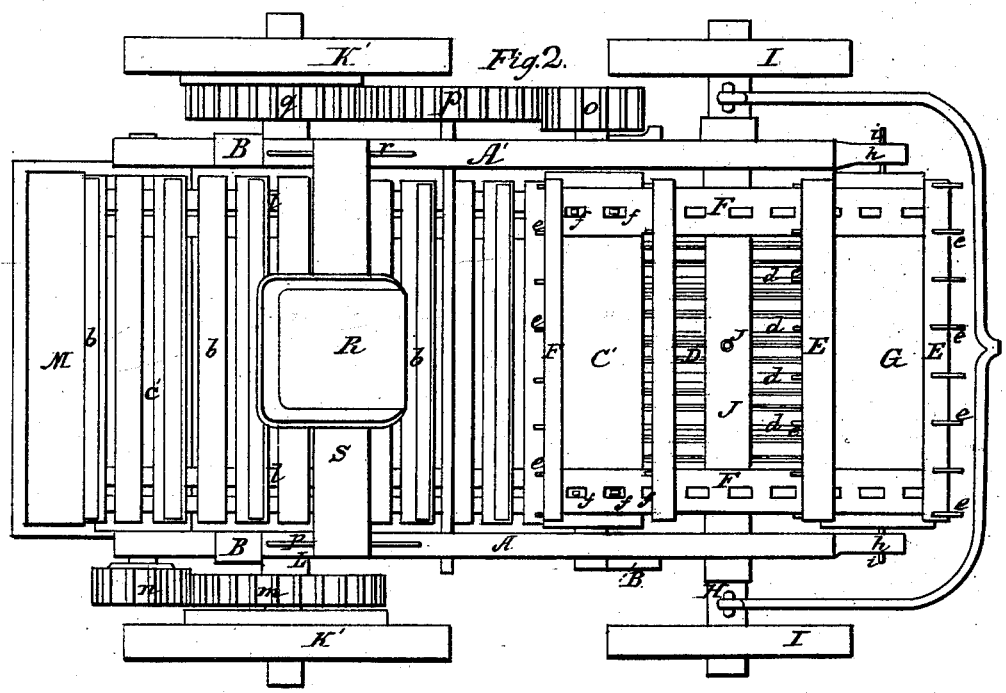
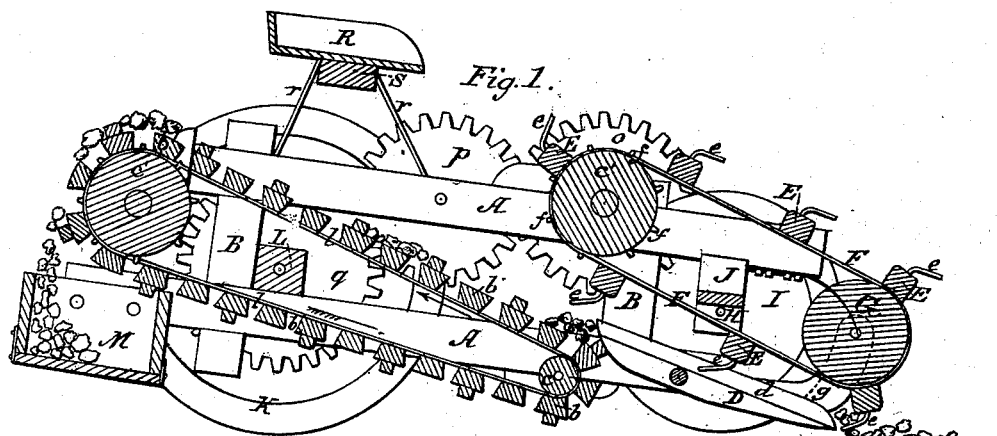
Witnesses
J. B. Woodruff
M. J. Ketchum
Inventor
Geo. N. Palmer

United States Patent Office.

GEORGE N. PALMER, OF GREENE, NEW YORK.

Letters Patent No. 77,833, dated May 12, 1868.

---

IMPROVEMENT IN STONE-GATHERING MACHINE.

---

The Schedule referred to in these Letters Patent and making part of the same.

---

TO ALL WHOM IT MAY CONCERN:

Be it known that I, GEORGE N. PALMER, of Greene, in the county of Chenango, in the State of New York, have invented certain new and useful Improvements in a Machine for Gathering, Picking up, Loading, Carrying off, and Discharging Small Stones; and the following is a full, clear, and exact description of the same, reference being had to the accompanying drawings, making a part of this specification, in which—

Figure 1 represents a section through a side elevation of the stone-picking, gathering, carrying off, and depositing-apparatus.

Figure 2 represents a plan or top view of the same, showing the connecting-gear and mode of dividing the power and applying it to both driving-wheels, so as to prevent any side draught to the machine.

The object of my invention is to facilitate the clearing off the surface of land, seeded down for mowing and other purposes, of all of the small boulders and loose stones that lay on the surface, so that mowing-machines and scythes can work close to the surface.

My invention consists in the construction of a broad shoe or scraper, formed with a series of semicircular grooves or smooth channels, the front end having projecting points or fingers for picking and guiding small stones into the grooves, by the action of a series of rakes, having spring-teeth, which are secured at regular intervals to endless belts on both sides of the machine, so that the rake-teeth follow in the grooves of the shoe or scraper to convey the stones back on to an endless apron, which is driven by independent mechanism from one side driving-wheel, while the series of rakes is operated by the other driving-wheel opposite; also in the arrangement for making the grooved shoe and endless rakes movable, so that they will conform to the surface of the ground.

To enable others to make and use my invention, I will describe it more fully, referring to the drawings, and to the letters marked thereon.

At any desired distance apart I place two frames, A A, the longitudinal bars or side-pieces being tied together by halving in and bolting on two vertical bars, B B, to secure them at a suitable distance apart to form the bearings for the journals of the endless-belt rollers C C', so that the apron, $b\ b\ b\ b$, is placed in a position to receive the stones $a\ a\ a\ a$, as they are drawn up the incline in the grooves $d\ d\ d\ d$, in the shoe or scraper D, by the action of the rake-teeth $e\ e\ e\ e$, in the heads E E E, which are secured to two endless belts, F F, or chain-gear, driven by the cogs $f f f$ in the roller C'.

The endless raking or stone-gathering mechanism extends forward over the roller G, which is hung in curved runner-shaped pieces, $g\ g$, which are fastened to the sides of the shoe D, the same being pivoted to the front ends of the lower side-pieces of the frame A A in such manner as to allow the shoe D and rakes E to rise and fall, so as to conform to the surface of the ground, there being a slight pressure to keep it on the surface by the action of the springs $h\ h$ resting on the journals $i\ i$ of the roller G, so that the rakes and their teeth $e\ e\ e\ e$ will always retain their relative position to the points $c\ c\ c$ of the grooved shoe D.

My improved stone-gatherer is made to run on four wheels, I I, being on the forward axle, H, which passes through between the front ends of the top and bottom pieces of the frame A A and the rake-belts F F, where it is secured to the rocker J by the king-bolt $j$, so that the forward wheels are free to cramp the machine to turn around, the same as an ordinary wagon, and a bail-tongue or shafts may be attached to the front axle in the ordinary manner.

The hind axle, L, on which the rear wheels, K K, run, is bolted to the top of the lower side-piece of the frame A A, so that it is between the belts or chains $l\ l$ of the endless apron or rack $b\ b\ b\ b$, which receive the stones from the grooved shoe D, and carry them over the roller C and drop them into the box M, which is secured to the rear ends of the lower longitudinal frame-piece A A, to be carried off from the field, the bottom of the box M being hinged so as to fall down and discharge its load. The endless apron or rack is driven by a pinion, $n$, on one end of the shaft of the roller C, and a spur-gear wheel, $m$, on one of the driving-wheels, K.

The rakes or gathering-mechanism are put in operation by the pinion $o$, on the end of the shaft of the roller C', and a counter cog-wheel, P, connecting it with the gear-wheel $q$, on the other driving-wheel K, thus equalizing the power applied to work the machine between both driving-wheels, and effectually preventing any side draught.

A seat, R, may be placed on a piece of board or plank, S, and supported in an elevated position on braces $v\ v$, to the top of the frame A A, for the driver.

What I claim as my invention, and desire to secure by Letters Patent, is—

1. The broad shoe or scraper, formed with a series of grooves or channels, and having projecting points or fingers for gathering and conveying small stones, as herein described.

2. I claim the shoe D, as constructed, in combination with a series of rakes, E, with spring-teeth $e\ e$, when secured to endless belts F F, or chain-gear, for loosening and picking up small stones from the surface of the ground, substantially as herein set forth.

3. I claim hinging the grooved shoe or scraper D to the frame A A, and controlling it by the springs $h\ h$ in such a manner that it will adjust itself to the surface of the ground when in operation, substantially as herein described.

In testimony whereof, I hereby subscribe my name in the presence of—

GEO. N. PALMER.

Witnesses:
    J. B. WOODRUFF,
    W. J. KETCHAM.